No. 697,759. Patented Apr. 15, 1902.
A. LA D. WALKER.
EGG SEPARATOR.
(Application filed Jan. 9, 1902.)
(No Model.)

WITNESSES:
C. H. Walker,
Frank E. Rapp.

INVENTOR
Ambrose La Dow Walker
BY Frank Appleman
Attorney

UNITED STATES PATENT OFFICE.

AMBROSE LA DOW WALKER, OF CAMDEN, NEW JERSEY.

EGG-SEPARATOR.

SPECIFICATION forming part of Letters Patent No. 697,759, dated April 15, 1902.

Application filed January 9, 1902. Serial No. 89,020. (No model.)

*To all whom it may concern:*

Be it known that I, AMBROSE LA DOW WALKER, a citizen of the United States of America, residing at Camden, in the county of Camden and State of New Jersey, have invented certain new and useful Improvements in Egg-Separators, of which the following is a specification.

This invention relates to an egg-separator, and has for its object to produce a device which will effect a separation of the parts of an egg without undue care on the part of the manipulator.

The object of the invention is the production of a novel article of manufacture into which the contents of an egg-shell may be deposited and whereby the tilting of the receptacle will cause the "white" of the egg to pass from the receptacle while confining the yolk.

Furthermore, the object of the invention is to provide an egg-separator and a guard for retaining the yolk when the said receptacle is tilted.

A still further object of the invention is to produce an egg-separator which will possess advantages in points of simplicity and efficiency, proving at the same time comparatively inexpensive.

With the foregoing and other objects in view the invention consists in details of construction and in the arrangement of the parts to be hereinafter more fully set forth and claimed.

In describing the invention in detail reference will be had to the accompanying drawings, forming part of this specification, wherein like characters denote corresponding parts in the several views, and in which—

Figure 1:
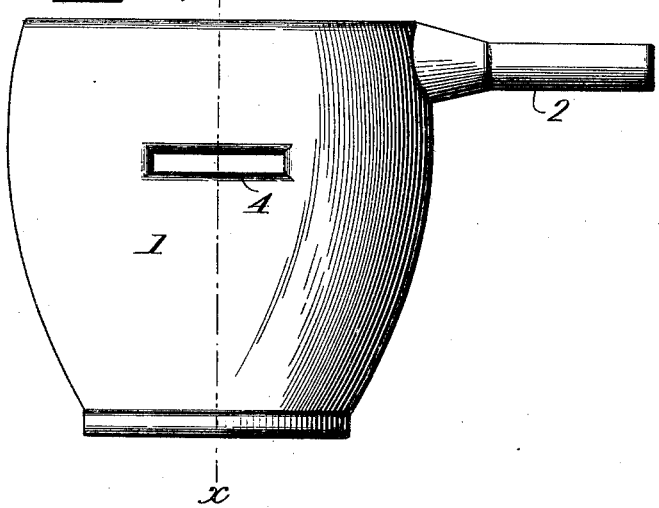
Figure 2:
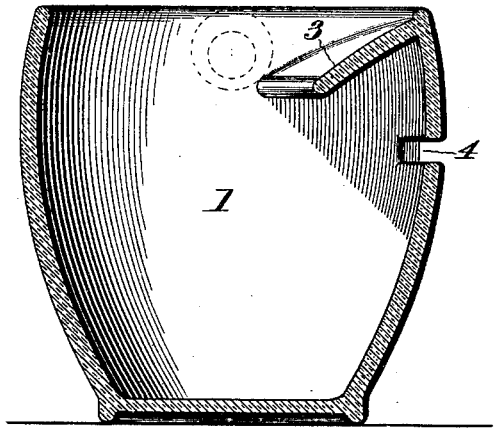

Figure 1 is a view in elevation of an egg-separator embodying the invention. Fig. 2 is a vertical sectional view on the line *x x* of Fig. 1.

In the drawings, 1 indicates the cup, having a handle 2 projecting from the side thereof near the top, said handle being of any preferred construction. A lip or guard 3 is formed with or attached to the upper edge of the inner wall of the receptacle and extends downwardly on an incline to form a trap for the yolk, as fully shown in Fig. 2. The rectangular or other shaped opening 4 is formed in the receptacle under the guard, said opening being of such size to permit the white of the egg to escape, while confining the yolk within the receptacle. As the cup is tilted it will be observed the guard will prevent the yolk or contents of the receptacle from escaping over the edge.

It will be readily understood that this device may be made of such size as to receive a large number of eggs and that the whites thereof may be drawn off at a single operation, or it may be made to hold but one or two eggs, that being a matter of proportion which may be changed to suit particular requirements without departing from the scope of the invention.

The construction and operation, as well as the advantages, will, it is thought, be understood from the foregoing description, it being noted that slight changes in details may be resorted to for successfully carrying the invention into practice.

Having fully described the invention, what I claim as new, and desire to secure by Letters Patent, is—

An egg-separator, comprising a receptacle having a handle, a guard extending from the inner upper edge of the receptacle on an incline toward the bottom, said receptacle having an opening under the guard, as and for the purpose described.

In testimony whereof I affix my signature, in the presence of two witnesses, this 23d day of December, 1901.

AMBROSE LA DOW WALKER.

Witnesses:
WILLIAM J. BODDY,
SILAS ROBINSON.